United States Patent
Chen et al.

(10) Patent No.: US 9,400,393 B2
(45) Date of Patent: Jul. 26, 2016

(54) DISPLAY APPARATUS, VARIABLE PARALLAX BARRIER MODULE, AND DISPLAY METHOD

(71) Applicant: Industrial Technology Research Institute, Hsinchu (TW)

(72) Inventors: Wu-Li Chen, Taipei (TW); Chao-Hsu Tsai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 118 days.

(21) Appl. No.: 14/151,830

(22) Filed: Jan. 10, 2014

(65) Prior Publication Data
US 2015/0036211 A1 Feb. 5, 2015

(30) Foreign Application Priority Data
Aug. 2, 2013 (TW) .............................. 102127837 A (51) Int. Cl.
*G02B 27/22* (2006.01)
*H04N 13/04* (2006.01)

(52) U.S. Cl.
CPC .......... *G02B 27/2214* (2013.01); *H04N 13/045* (2013.01); *H04N 13/0413* (2013.01)

(58) Field of Classification Search
CPC .. G02B 27/2214; G02B 27/22; G02F 1/1335; G02F 1/1343; H04N 13/0413; H04N 13/0411; H04N 13/0409
USPC ...................................... 359/462, 464; 348/56
See application file for complete search history.

(56) References Cited

U.S. PATENT DOCUMENTS 7,825,999 B2 11/2010 Chestak et al.
2011/0096152 A1 4/2011 Hsu et al.
(Continued)

FOREIGN PATENT DOCUMENTS

CN 101341763 1/2009
CN 102457743 5/2012
(Continued)

OTHER PUBLICATIONS

"Office Action of Taiwan Counterpart Application", issued on Mar. 25, 2015, p. 1-p. 6.
(Continued)

*Primary Examiner* — Bumsuk Won
*Assistant Examiner* — Ephrem Mebrahtu
(74) *Attorney, Agent, or Firm* — Jianq Chyun IP Office (57) ABSTRACT

A display apparatus including a display module, a variable parallax barrier module, and a control unit is provided. The display module is configured to provide a light beam. The variable parallax barrier module is disposed on a transmission path of the light beam. The variable parallax barrier module respectively forms a plurality of different parallax barrier patterns during different display periods of a frame time. Each of the parallax barrier patterns includes a plurality of light-transmissive regions and a plurality of light-shielding regions alternately arranged along an arrangement direction. In all of light-transmissive regions of the parallax barrier patterns, any two adjacent light-transmissive regions partially overlap each other. The control unit enables a plurality of display images displayed by the display module during the different display periods to respectively correspond to the parallax barrier patterns. A variable parallax barrier module and a displaying method are also provided.

21 Claims, 8 Drawing Sheets

(56) References Cited

U.S. PATENT DOCUMENTS

| | | | |
|---|---|---|---|
| 2012/0092470 A1* | 4/2012 | Okamoto | 348/60 |
| 2012/0307170 A1 | 12/2012 | Inoue et al. | |
| 2013/0148070 A1 | 6/2013 | Kim et al. | |

FOREIGN PATENT DOCUMENTS

| | | |
|---|---|---|
| CN | 102681267 | 9/2012 |
| CN | 102749763 A | 10/2012 |
| CN | 103152594 | 6/2013 |
| TW | 201213865 | 4/2012 |
| TW | 201215919 | 4/2012 |
| TW | 201219836 | 5/2012 |
| TW | 201312164 | 3/2013 |

OTHER PUBLICATIONS

Hyo Jin Lee, et al., "A High Resolution Autostereoscopic Display Employing a Time Division Parallax Barrier," SID Symposium Digest of Technical Papers, vol. 37, Issue 1, Jun. 2006, pp. 81-84.

Fu-Hao Chen, et al., "Measurement of the Frame-Sequential Displays," IMID/IDMC/ASIA Display Digest, Jan. 2010, pp. 346-347.

Wu-Li Chen, et al., "Development of an Autostereoscopic Display System Using Projectors Array," 3DTV-Conference: The True Vision—Capture, Transmission and Display of 3D Video (3DTV-CON), Jun. 7-9, 2010, pp. 1-4.

Wei-Ting Yen, et al., "Moiré Pattern Reduction by Using Special Designed Parallax Barrier in an Autostereoscopic Display," SPIE Proceedings vol. 7690, Apr. 23, 2010, pp. 1-4.

Tetsuro Kuwayama, et al., "A Novel Crosstalk Reduction Method for a 46-inch Temporally Interlaced Autostereoscopic 3D LCD Display," 31st International display research conference, Sep. 19-22, 2011, pp. 1-21.

Wu-Li Chen, et al., "A high-resolution autostereoscopic display system with a wide view angle using an LCOS projector array," Journal of the Society for Information Display, vol. 18, Issue 9, Sep. 2010, pp. 1-20.

"Office Action of China Counterpart Application", issued on Mar. 2, 2016, p. 1-p. 12.

* cited by examiner

DISPLAY APPARATUS, VARIABLE PARALLAX BARRIER MODULE, AND DISPLAY METHOD

CROSS-REFERENCE TO RELATED APPLICATION

This application claims the priority benefit of Taiwan application serial no. 102127837, filed on Aug. 2, 2013. The entirety of the above-mentioned patent application is hereby incorporated by reference herein and made a part of this specification.

TECHNICAL FIELD

The technical field relates to a display apparatus, a variable parallax barrier module and a display method.

BACKGROUND

In recent years, along with development of display techniques, amelioration of image dynamic effect, improvement of color performance and contrast, and people's pursuit for more realistic and richer viewing experiences, three-dimensional (3D) image displays have become one of actively developed products in related technical field. Generally, the 3D displays are categorized into stereoscopic displays and auto-stereoscopic displays, and development of related techniques of the auto-stereoscopic display is a field to be exploited in related display industry in recent years.

The related techniques of the auto-stereoscopic display approximately comprise a holographic stereoscopic image display technique, a volumetric stereoscopic image display technique, a multi-planar stereoscopic image display technique, a multiplexed 2D stereoscopic image display technique, and so forth, according to working principles thereof. The multiplexed 2D stereoscopic image display technique may simultaneously comprise switching functions of 2D and 3D image display modes, which has received wide-speared attentions in the field of 3D image display technique in recent years. In addition, the multiplexed 2D stereoscopic image display technique may further be categorized into a spatial-multiplexed stereoscopic image display technique and a time-multiplexed stereoscopic image display technique. As compared to the spatial-multiplexed stereoscopic image display technique, the time-multiplexed stereoscopic image display technique does not reduce a resolution of an image when switching the 2D and 3D image display modes.

In general, the time-multiplexed stereoscopic image display technique is to implement a specially designed beam splitting mechanism to respectively and continuously project a plurality of viewing zone images arranged in different order to a plurality of different viewing zones at different time points, so as to achieve a stereoscopic display effect. For instance, a design of the time-multiplexed stereoscopic image display technique is to use a switchable parallax barrier to achieve a beam splitting effect. However, as a result, brightness of a displayed stereo image is limited by the length of a light outputting time of the image, a light transmittance of a liquid crystal parallax barrier and an aperture ratio of the parallax barrier, thereby influencing the quality of the image.

Therefore, in order to effectively enhance an image quality for a screen of a display apparatus, improvement of the image brightness under a stereo image display mode has become one of the major issues for the technological development of related fields.

SUMMARY

One of exemplary embodiments provides a display apparatus comprising a display module, a variable parallax barrier module and a control unit. The display module is configured to provide a light beam. The variable parallax barrier module is disposed on a transmission path of the light beam, and respectively forms a plurality of different parallax barrier patterns during different display periods of a frame time. Each of the parallax barrier patterns comprises a plurality of light-transmissive regions and a plurality of light-shielding regions alternately arranged along an arrangement direction. In all of light-transmissive regions of the parallax barrier patterns, any two adjacent light-transmissive regions partially overlap each other. The control unit enables a plurality of display images displayed by the display module during the different display periods to respectively correspond to the parallax barrier patterns.

One of exemplary embodiments provides a variable parallax barrier module comprising a plurality of switching units arranged along an arrangement direction and a drive unit. The drive unit drives the switching units to form a plurality of different parallax barrier patterns during different display periods, wherein each of the parallax barrier patterns comprises a plurality of light-transmissive regions and a plurality of light-shielding regions alternately arranged along the arrangement direction. In all of light-transmissive regions of the parallax barrier patterns, any two adjacent light-transmissive regions partially overlap each other.

One of exemplary embodiments provides a display method comprising: providing a light beam by a display module; forming a plurality of different parallax barrier patterns on a transmission path of the light beam respectively during different display periods of a frame, wherein each of the parallax barrier patterns comprises a plurality of light-transmissive regions and a plurality of light-shielding regions alternately arranged along an arrangement direction, and in all the parallax barrier patterns, any two adjacent light-transmissive regions partially overlap each other; and causing a plurality of display images displayed by the display module during the display periods to respectively correspond to the parallax barrier patterns.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1A:
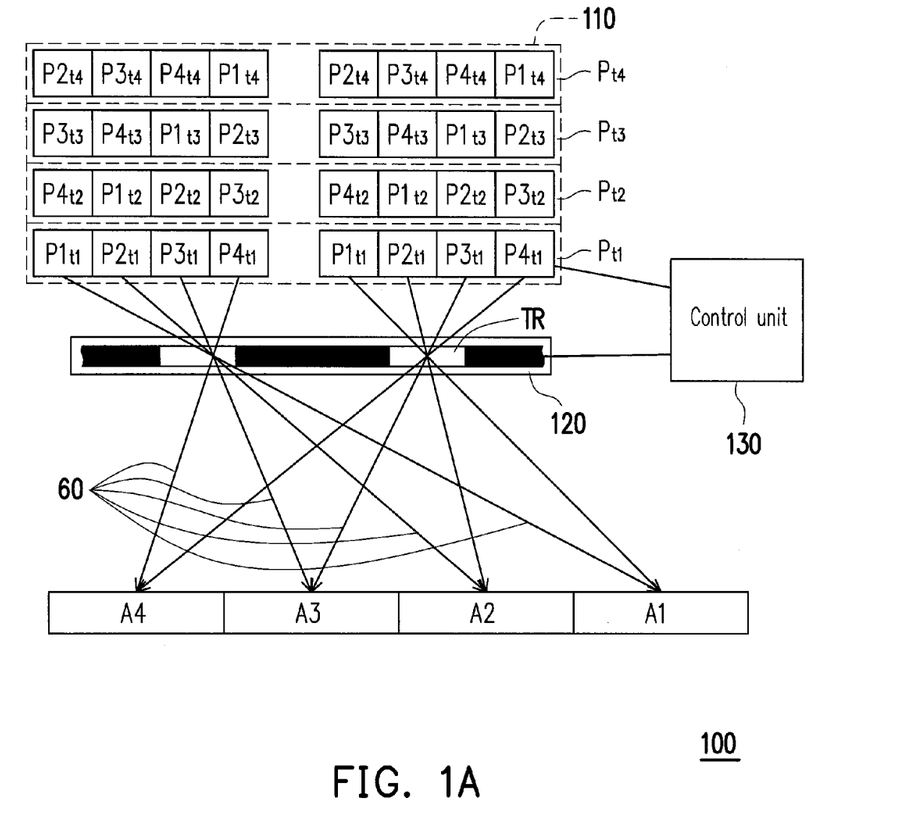
FIG. 1A is an architecture diagram of a display apparatus according to an exemplary embodiment.
Figure 1B:
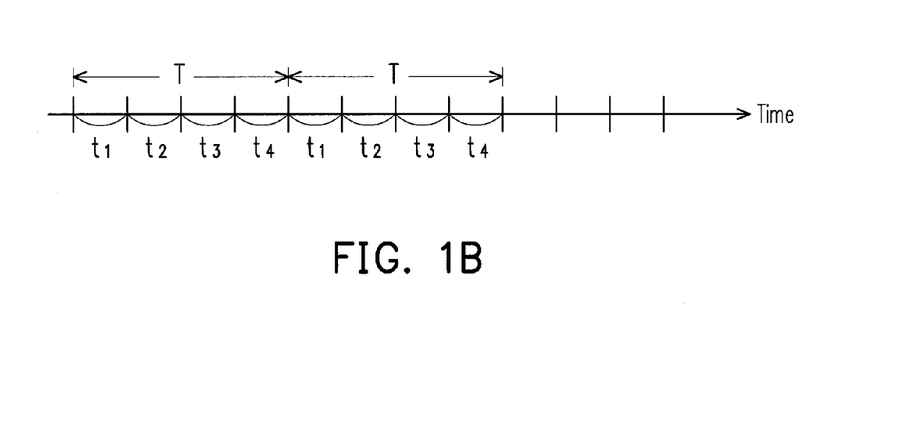
FIG. 1B is a schematic diagram illustrating different display periods of the display apparatus of FIG. 1A on a timeline.

FIG. 1A is an architecture diagram of a display apparatus according to an exemplary embodiment. FIG. 1B is a schematic diagram illustrating different display periods of the display apparatus of FIG. 1A on a timeline. FIG. 2A through FIG. 2D are schematic front views of a plurality of different parallax barrier patterns during the different display periods according to the exemplary embodiment of FIG. 1. Firstly, referring to FIG. 1A, in the present embodiment, the display apparatus 100 comprises a display module 110, a variable parallax barrier module 120 and a control unit 130. In the present embodiment, the display module 110, for example, is a light-emitting diode display, an organic light-emitting diode display or a liquid crystal display, and the variable parallax barrier module 120, for example, may be a liquid crystal parallax barrier module, but the disclosure is not limited thereto. Referring to FIG. 1A and FIG. 1B, in the present embodiment, the display module 110 is configured to provide a light beam 60, whilst the variable parallax barrier module 120 is disposed on a transmission path of the light beam 60 and forms a plurality of different light-transmissive regions TR in the space. In addition, as shown in FIG. 1B, in the present embodiment, a plurality of frame times T may be differentiated on the time line, and each of the frame times T comprises a plurality of different display periods $t_1, t_2, t_3, t_4$. The variable parallax barrier module 120 may form a plurality of different parallax barrier patterns NP1, NP2, NP3, NP4 during the different display periods $t_1, t_2, t_3, t_4$ (as shown in FIG. 2A through FIG. 2D). In the following below, detail descriptions regarding the structure and actuating mechanism of the variable parallax barrier module 120 are further provided in accordance with FIG. 2A through FIG. 3.

Figure 2A:
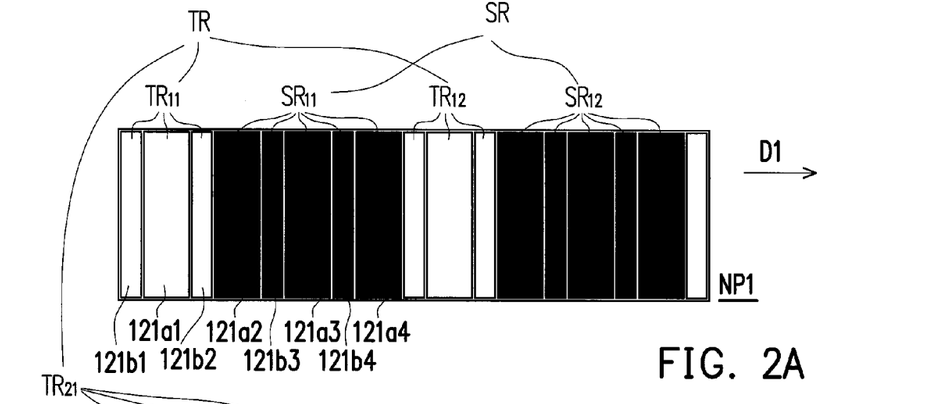
FIG. 2A through FIG. 2D are schematic front views of a plurality of different parallax barrier patterns during the different display periods according to the exemplary embodiment of FIG. 1.
Figure 2B:
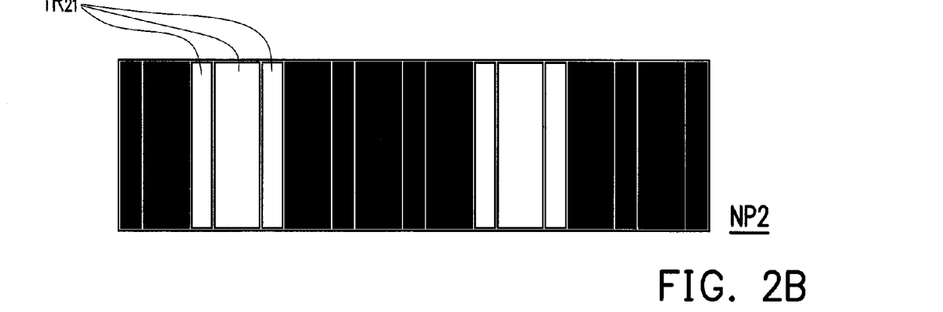
Figure 2C:
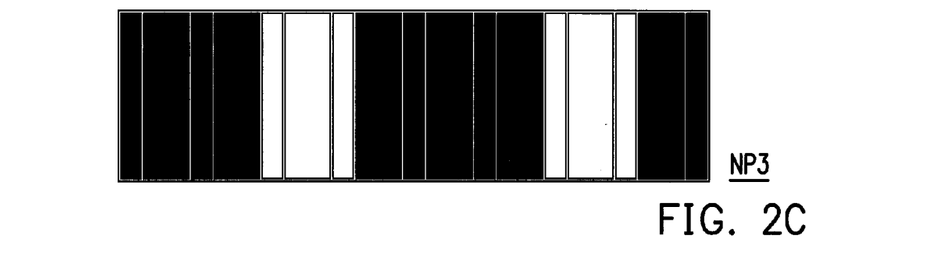
Figure 2D:
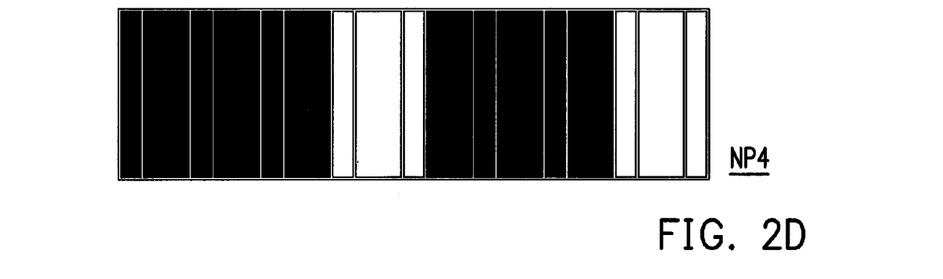
Figure 3:
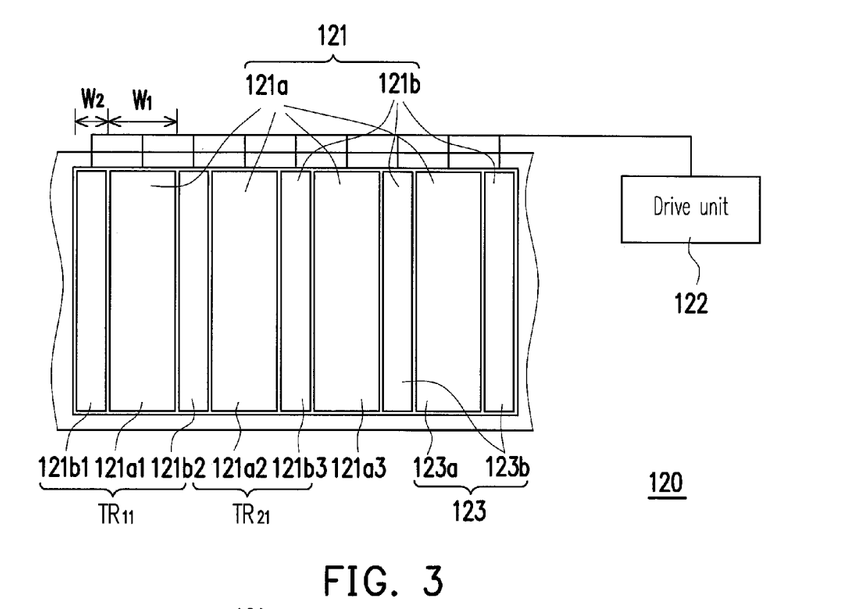
FIG. 3 is schematic front view illustrating a partial region of a variable parallax barrier module according to the exemplary embodiment of FIG. 1.

FIG. 3 is schematic front view illustrating a partial region of a variable parallax barrier module according to the exemplary embodiment of FIG. 1. Referring to FIG. 2A through FIG. 2D, in the present embodiment, the variable parallax barrier module 120 respectively forms the different parallax barrier patterns NP1, NP2, NP3, NP4 respectively during the different display periods $t_1, t_2, t_3, t_4$ of a frame time T, and each of the parallax barrier patterns NP1, NP2, NP3, NP4 comprises a plurality of light-transmissive regions TR and a plurality of light-shielding regions SR alternately arranged along an arrangement direction D1. For instance, the parallax barrier pattern NP1 comprises a plurality of light-transmissive regions $TR_{11}$, $TR_{12}$ and a plurality of light-shielding regions $SR_{11}$, $SR_{12}$ alternately arranged along the arrangement direction D1.

Next, referring to FIG. 3, in all the light-transmissive regions TR of the parallax barrier patterns NP1, NP2, NP3, NP4, any two adjacent light-transmissive regions, such as $TR_{11}$ and $TR_{21}$, partially overlap each other. Specifically, as shown in FIG. 3, in the present embodiment, the variable parallax barrier module 120 comprises a plurality of switching units 121 arranged along the arrangement direction D1. The switching units 121 of the variable parallax barrier module 120 comprises a plurality of first switching units 121a and a plurality of second switching units 121b alternately arranged along the arrangement direction D1. In the present embodiment, a width $W_1$ of each of the first switching units 121a in the arrangement direction D1 is different from a width $W_2$ of each of the second switching units 121b in the arrangement direction D1, but the disclosure is not limited thereto.

More specifically, in each of the display periods $t_1, t_2, t_3, t_4$, each of the first switching units 121a in a portion of the first switching units 121a and two of the second switching units 121b adjacently located at two sides of the each of the first switching units 121a in the portion of the first switching units 121a are switched into a light-transmissive state so as to form the light-transmissive regions TR, while the remaining first switching units 121a and the remaining second switching units 121b are switched into a light-shielding state so as to form the light-shielding regions SR. For instance, in the display periods t1, a first switching unit 121a1 of the variable parallax barrier module 120 and two second switching units 121b1, 121b2 adjacently located at the two sides of the first switching unit 121a1 are switched into the light-transmissive state so as to form the light-transmissive regions $TR_{11}$, while the remaining first switching units 121a2, 121a3, 121a4 and the remaining second switching units 121b3, 121b4 are switched into the light-shielding state so as to form the light-shielding regions $SR_{11}$.

A method of the variable parallax barrier module 120 in forming the different parallax barrier patterns NP1, NP2, NP3, NP4 is further described in detail below. In the present embodiment, the variable parallax barrier module 120 further comprises a drive unit 122, wherein the drive unit 122 may independently control each of the first switching units 121a and each of the second switching units 121b. Specifically, the method of the variable parallax barrier module 120 in forming the different parallax barrier patterns NP1, NP2, NP3, NP4, for example, is to use the drive unit 122 to drive the switching units 121 to respectively form the different parallax barrier patterns NP1, NP2, NP3, NP4 during the different display periods $t_1, t_2, t_3, t_4$. Namely, in the present embodiment, the first switching units 121a and the second switching units 121b, for example, may respectively be a plurality of independently controllable strip-shaped pixels 123, and may be switched into the light-transmissive state or the light-shielding state. In addition, the drive unit 122 drives the strip-shaped pixels 123a, 123b to respectively control the first switching units 121a and the second switching units 121b to switch into the light-transmissive state or the light-shielding state, but the disclosure is not limited thereto. In the following below, an implementation of the variable parallax barrier module 120 in accordance with FIG. 4 is described.

Figure 4:
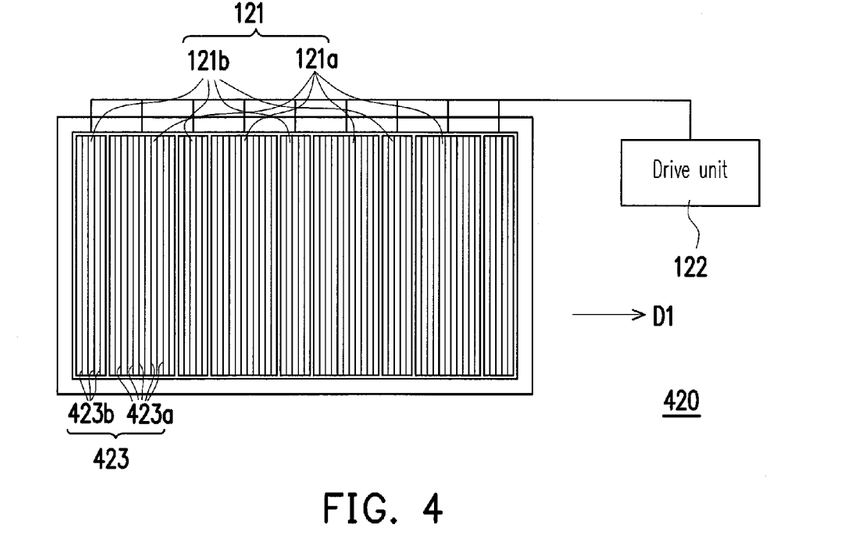
FIG. 4 is schematic front view illustrating a partial region of another variable parallax barrier module according to the exemplary embodiment of FIG. 1.

FIG. 4 is schematic front view illustrating a partial region of another variable parallax barrier module according to the exemplary embodiment of FIG. 1. Referring to FIG. 4, a variable parallax barrier module 420 of the present embodiment is similar to the variable parallax barrier module 120 of the embodiment illustrated in FIG. 3, and differences between the two are described as follows. in the present embodiment, the variable parallax barrier module 420 comprises a plurality of strip-shaped pixels 423 arranged along the arrangement direction D1, and each of the first switching units 121a comprises a plurality of strip-shaped pixels 423a in a portion of the strip-shaped pixels 423, and each of the second switching units 121b comprises a plurality of strip-shaped pixels 423b in another portion of the strip-shaped pixels 423, so that the drive unit 122 may drive the strip-shaped pixels 423a, 423b to respectively control the first switching units 121a and the second switching units 121b to switch into the light-transmissive state or the light-shielding state.

Next, referring to FIG. 1 again, the light beam 60 carries a plurality of display images $P_{t1}$, $P_{t2}$, $P_{t3}$, $P_{t4}$ displayed by the display module 110 during the different display periods $t_1$, $t_2$, $t_3$, $t_4$ of the frame time T. Specifically, in each of the display periods $t_1$, $t_2$, $t_3$, $t_4$, the display images $P_{t1}$, $P_{t2}$, $P_{t3}$, $P_{t4}$ displayed by the display module 110 comprise a plurality of viewing zone image sets $\{P1_{t1}, P2_{t2}, P3_{t3}, P4_{t4}\}$, $\{P1_{t2}, P2_{t2}, P3_{t2}, P4_{t2}\}$, $\{P1_{t3}, P2_{t3}, P3_{t3}, P4_{t3}\}$, $\{P1_{t4}, P2_{t4}, P3_{t4}, P4_{t4}\}$ sequentially staggered along the arrangement direction D1. For instance, during the display periods $t_1$, the display image $P_{t1}$ comprises the viewing zone image sets $P1_{t1}$, $P2_{t1}$, $P3_{t1}$, $P4_{t1}$ sequentially staggered along the arrangement direction D1. In the present embodiment, each of the viewing zone image sets, for example, may respectively be a viewing zone image sets $\{P1_{t1}, P1_{t2}, P1_{t3}, P1_{t4}\}$, a viewing zone image sets $\{P2_{t1}, P2_{t2}, P2_{t3}, P2_{t4}\}$, a viewing zone image sets $\{P3_{t1}, P3_{t2}, P3_{t3}, P3_{t4}\}$, or a viewing zone image sets $\{P4_{t1}, P4_{t2}, P4_{t3}, P4_{t3}\}$ displayed during the different display periods $t_1$, $t_2$, $t_3$, $t_4$. Lights emitted by the viewing zone image sets $\{P1_{t1}, P1_{t2}, P1_{t3}, P1_{t4}\}$, $\{P2_{t1}, P2_{t2}, P2_{t3}, P2_{t4}\}$, $\{P3_{t1}, P3_{t2}, P3_{t3}, P3_{t4}\}$, $\{P4_{t1}, P4_{t2}, P4_{t3}, P4_{t4}\}$ of the display images $P_{t1}$, $P_{t2}$, $P_{t3}$, $P_{t4}$, after passing through the variable parallax barrier module 120, may respectively be transmitted to a plurality of different viewing zones A1, A2, A3, A4 in the space.

More specifically, since the light-transmissive regions TR of each of the parallax barrier patterns NP1, NP2, NP3, NP4 move along with the time, display positions of the respective viewing zone image sets $\{P1_{t1}, P1_{t2}, P1_{t3}, P1_{t4}\}$, $\{P2_{t1}, P2_{t2}, P2_{t3}, P2_{t4}\}$, $\{P3_{t1}, P3_{t2}, P3_{t3}, P3_{t4}\}$, $\{P4_{t1}, P4_{t2}, P4_{t3}, P4_{t4}\}$ on the display module during the different display periods $t_1$, $t_2$, $t_3$, $t_4$ are different. For instance, positions of a plurality of viewing zone images $P1_{t1}$, $P1_{t2}$, $P1_{t3}$, $P1_{t4}$ of the viewing zone image set $\{P1_{t1}, P1_{t2}, P1_{t3}, P1_{t4}\}$ are different during the display periods $t_1$, $t_2$, $t_3$, $t_4$. Then, the control unit 130 enables the display images $P_{t1}$, $P_{t2}$, $P_{t3}$, $P_{t4}$ displayed by the display module 110 during the display periods $t_1$, $t_2$, $t_3$, $t_4$ to respectively correspond to the parallax barrier patterns NP1, NP2, NP3, NP4, so that the display apparatus 100, during the different display periods $t_1$, $t_2$, $t_3$, $t_4$, is able to respectively transmit the viewing zone images $P1_{t1}$, $P1_{t2}$, $P1_{t3}$, $P1_{t4}$ (or $P2_{t1}$, $P2_{t2}$, $P2_{t3}$, $P2_{t4}$; $P3_{t1}$, $P3_{t2}$, $P3_{t3}$, $P3_{t4}$; $P4_{t1}$, $P4_{t2}$, $P4_{t3}$, $P4_{t4}$) of a same viewing zone image set $\{P1_{t1}, P1_{t2}, P1_{t3}, P1_{t4}\}$ (or $\{P2_{t1}, P2_{t2}, P2_{t3}, P2_{t4}\}$, $\{P3_{t1}, P3_{t2}, P3_{t3}, P3_{t4}\}$, $\{P4_{t1}, P4_{t2}, P4_{t3}, P4_{t4}\}$) to a same viewing zone A1 (or A2, A3, A4). Namely, although the position of each of the viewing zone images $P1_{t1}$, $P1_{t2}$, $P1_{t3}$, $P1_{t4}$ of the viewing zone image set $\{P1_{t1}, P1_{t2}, P1_{t3}, P1_{t4}\}$ are different during the different display periods $t_1$, $t_2$, $t_3$, $t_4$, all the viewing zone images $P1_{t1}$, $P1_{t2}$, $P1_{t3}$, $P1_{t4}$ of the viewing zone image set $\{P1_{t1}, P1_{t2}, P1_{t3}, P1_{t4}\}$ are eventually transmitted to the same viewing zones A1. As a result, the design of each of the viewing zone image sets may be performed in the different display periods $t_1$, $t_2$, $t_3$, $t_4$, and a user is enabled to view the images with at least two viewing zones, thereby achieving a stereoscopic visual effects.

Noteworthily, in the present embodiment, even though the display apparatus 100 of FIG. 1 has taken four different parallax barrier patterns NP1, NP2, NP3, NP4, four viewing zone image sets and four viewing zones as an example, but the disclosure does not intended to limit the amounts of the parallax barrier patterns, the viewing zone image sets and the viewing zones. In other embodiments, the display apparatus may also have two or more sets of viewing zone images and two or more viewing zones in accordance to the designs of the parallax barrier patterns having appropriate light-transmissive regions. It will be apparent to those skilled in the art that various modifications and variations can be made to the structure of the disclosed embodiment based on the actual requirements, and thus no further elaboration is provided herein.

In addition, a pitch of the different display periods $t_1$, $t_2$, $t_3$, $t_4$ and a frame rate of each of the display images $P_{t1}$, $P_{t2}$, $P_{t3}$, $P_{t4}$ may be determined according to the numbers of the frame time T and viewing zones. For instance, in the present embodiment, taking the display apparatus having four viewing zones A1, A2, A3, A4 as an example, if the frame time T is 1/60 second, then the display apparatus 100 is required to make a time length of each of the different display periods $t_1$, $t_2$, $t_3$, $t_4$ to be 1/240 seconds. In other words, the display apparatus 100 is required to refresh the display images $P_{t1}$, $P_{t2}$, $P_{t3}$, $P_{t4}$ with a frame rate of 240 Hz, so that the viewing zone images of each of the viewing zones A1, A2, A3, A4 are all in full resolution, but the disclosure is not limited thereto. Those skilled in the art should able to control and modify the display periods based on the actual requirements, and thus no further elaboration is provided herein.

However, as a result, design considerations regarding proportions of the light-transmissive regions TR of each of the parallax barrier patterns NP1, NP2, NP3, NP4 and a length of the different display periods $t_1$, $t_2$, $t_3$, $t_4$, as described in above, may all influence a stereo image brightness of the display apparatus 100. Therefore, how the structure design of the display apparatus 100 is able to enhance an overall stereo image brightness is further described in detail below in accordance with FIG. 5A through FIG. 9.

Figure 5A:
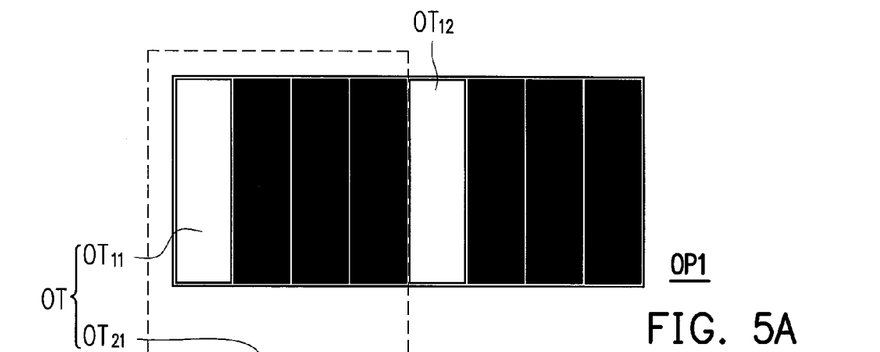
FIG. 5A through FIG. 5D are schematic front views of a plurality of different parallax barrier patterns according to a comparative embodiment during different display periods.
Figure 5B:
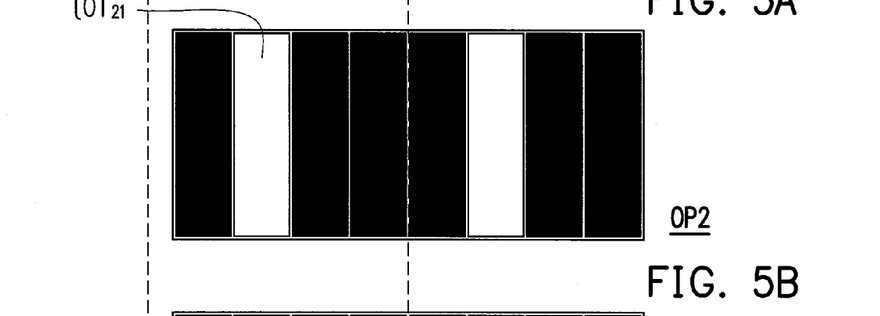
Figure 5C:
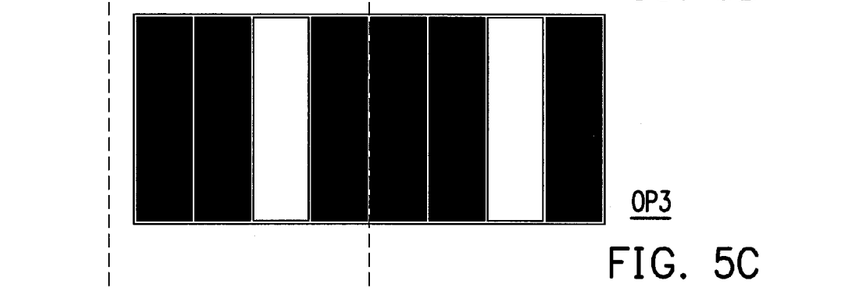
Figure 5D:
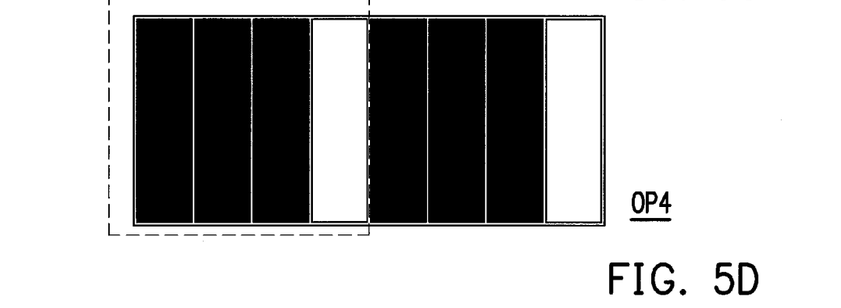
Figure 6:
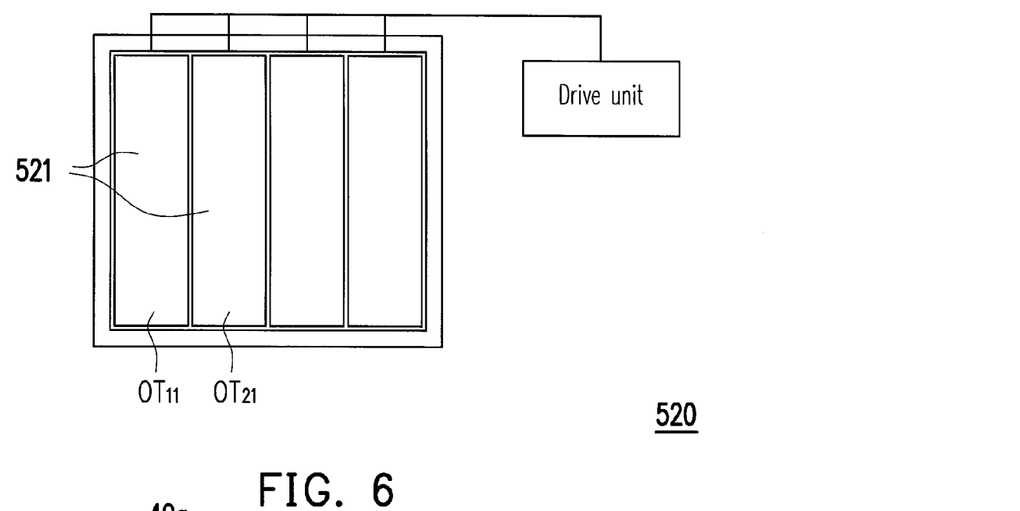
FIG. 6 is schematic front view illustrating a partial region of a variable parallax barrier module according to the comparative embodiment of FIG. 5A through FIG. 5D.

FIG. 5A through FIG. 5D are schematic front views of a plurality of different parallax barrier patterns according to a comparative embodiment during different display periods. FIG. 6 is schematic front view illustrating a partial region of a variable parallax barrier module according to the comparative embodiment of FIG. 5A through FIG. 5D. Referring to FIG. 5A through FIG. 6, a variable parallax barrier module 520 of the present comparative embodiment is similar to the variable parallax barrier module 120 of the embodiment illustrated in FIG. 3, wherein a difference between the two is described as follows. In the comparative embodiment, in some of a plurality of light-transmissive regions $OT_{11}$, $OT_{12}$, $OT_{21}$ of a plurality of parallax barrier patterns OP1, OP2, OP3, OP4, two adjacent light-transmissive regions (such as $OT_{11}$, $OT_{21}$) do not overlap each other. This difference causes the display apparatus 100 applying the variable parallax barrier module 120 of the embodiment illustrated in FIG. 3, as in compared to the display apparatus 100a applying the variable parallax barrier module 520 illustrated in the comparative embodiment, has higher image brightness. More detail descriptions are further provided below in accordance with FIG. 7 through FIG. 10.

Figure 7:
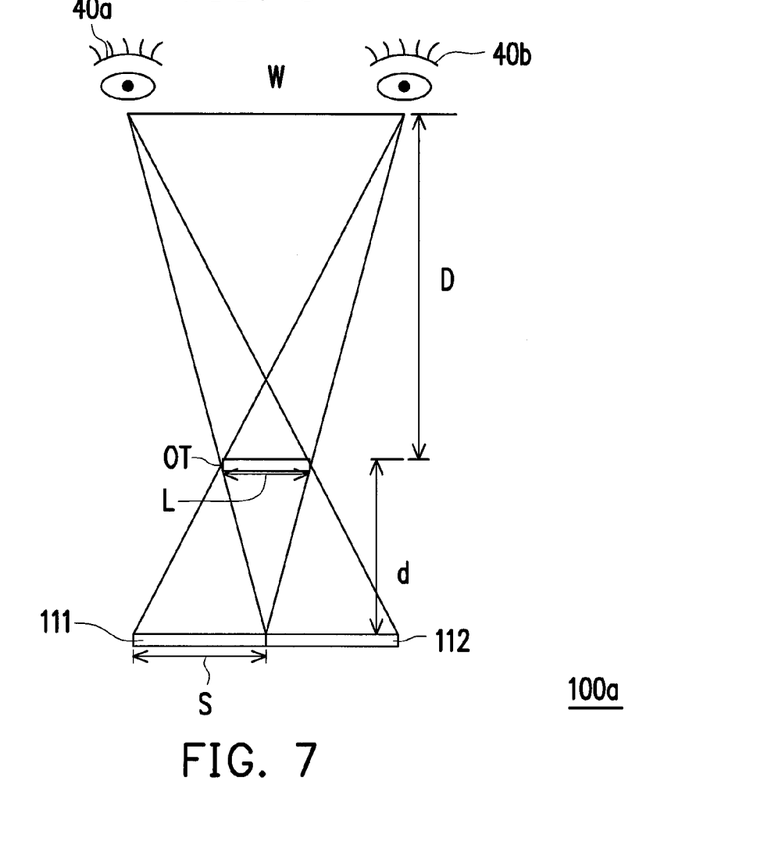
FIG. 7 is a schematic diagram of a display apparatus according to the comparative embodiment of FIG. 6.

FIG. 7 is a schematic diagram of a display apparatus according to the comparative embodiment of FIG. 6. Referring to FIG. 7, in the display apparatus 100a of the comparative embodiment, since a distance W between both eyes 40a, 40b of the user has an approximate range, the width of each of the viewing zones is often designed according to this ranging distance W so that the both eyes 40a, 40b of the user may fall within different viewing zones. For instance, the distance W between the both eyes of the user is generally preset as 6.5 cm, but this value range is provided as an example, and the disclosure is not limited thereto. In addition, as shown in FIG. 7, in the display apparatus 100a of the comparative embodiment, S is a width of each of the display pixels of the display pixels 111, 112 of the display module 110 (illustrated in FIG. 1) in the arrangement direction D1, D is an optimum viewing distance from the variable parallax barrier module 520 to each of the viewing zones, and d is a distance between the display pixels 111, 112 and the variable parallax barrier module 520.

As shown in FIG. 7, specifically, in the comparative embodiment, the light-transmissive regions OT has a width L, so as to enable the both eyes 40a, 40b of the user to only view the display images displayed by the different display pixels 111, 112, respectively. For instance, one eye 40a of the user can only view the display images displayed by the display pixel 112, while the other eye 40b of the user can only view the display images displayed by the display pixel 111, so that a three-dimensional visual effect may be achieved. Since a triangle using the width S of the display pixel 111 as the base and a triangle using the distance W between the both eyes 40a, 40b of the user as the base both have specific parametrical proportional relationships, each of the parameters L, S, D, d, W satisfies the following formulae:

$$\frac{L}{S} = \frac{D}{D+d} \quad \text{(i)}$$

$$\frac{W}{D} = \frac{S}{d}, \quad \text{(ii)}$$

wherein a relationship between the width L of the light-transmissive regions OT and the other parameters may be defined as:

$$L = \frac{D}{D+d}S. \quad \text{(iii)}$$

Figure 8:
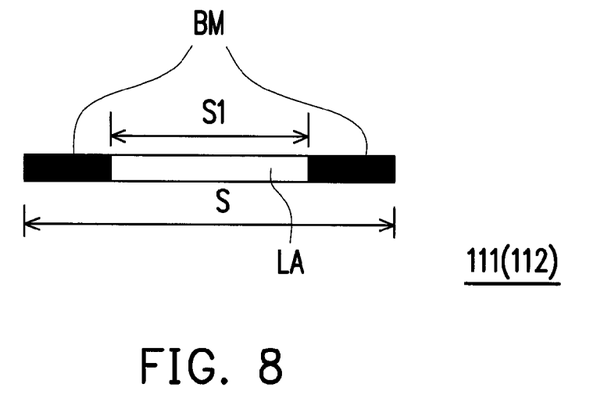
FIG. 8 is a schematic diagram of a display pixel according to the comparative embodiment of FIG. 7.

FIG. 8 is a schematic diagram of a display pixel according to the comparative embodiment of FIG. 7. Referring to FIG. 1 and FIG. 8, in general, the display pixels 111, 112 of the display module 110 usually have a non-light-emitting region BM therein. For instance, a Black Matrix of a liquid crystal display is namely a type of the non-light-emitting region BM. As shown in FIG. 8, a width of the display pixels 111(112) is S, but a width of the light-emitting region LA is S1, wherein the width S1 is smaller than the width S. If a ratio r is defined as a ratio of the width S1 of a light-emitting region LA of each of the display pixels 111(112) in the arrangement direction D1 to the width S of each of the display pixels 111(112) in the arrangement direction D1, then when the value of r becomes smaller, the light-emitting region LA of the display pixels 111(112) becomes smaller and the region of each of the display pixels 111(112) contributing to the image brightness also becomes smaller.

Therefore, in order to enhance the overall image brightness, each of the parallax barrier patterns NP1, NP2, NP3, NP4 in the variable parallax barrier module 120 of the display apparatus 100 is designed with the existence of the non-light-emitting region BM, so as to enable two adjacent light-transmissive regions, such as $TR_{11}$ and $TR_{21}$, to partially overlap each other during the different display periods $t_1, t_2, t_3, t_4$, and thereby the proportion of the light-transmissive region TR in each of the parallax barrier patterns NP1, NP2, NP3, NP4 may be enhanced. More detail descriptions are further provided below in accordance with FIG. 9 through FIG. 10.

Figure 9:
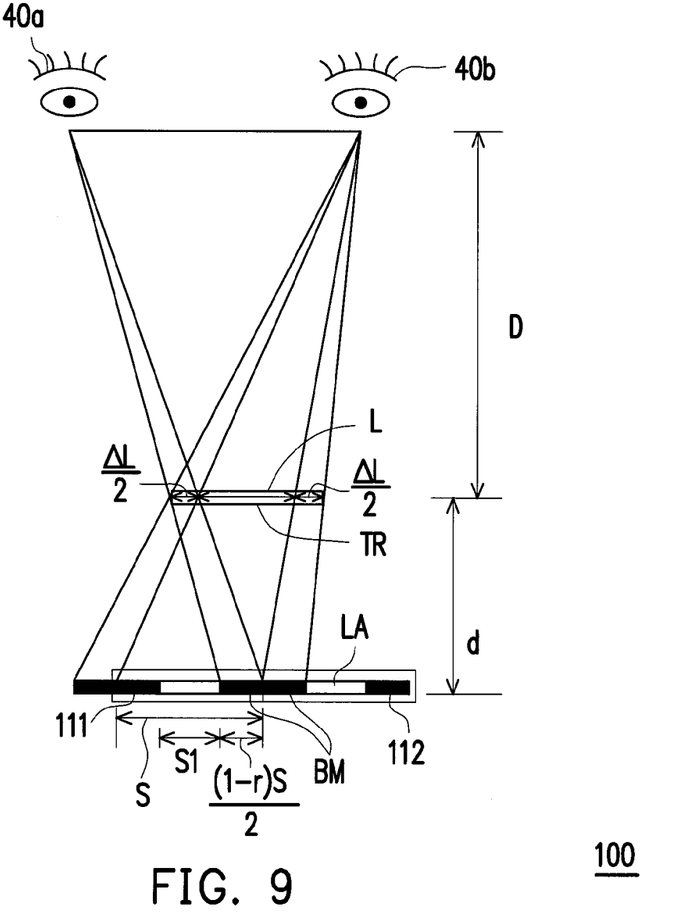
FIG. 9 is a schematic diagram of a display apparatus according to the exemplary embodiment of FIG. 3.

FIG. 9 is a schematic diagram of a display apparatus according to the exemplary embodiment of FIG. 3. As shown in FIG. 9, in the display apparatus 100 of the present embodiment, S is still the width of each of the display pixels 111(112) of the display module 110 in the arrangement direction D1, D is also the optimum viewing distance from the variable parallax barrier module 120 to each of the viewing zones A1, A2, A3, A4, and d is also the distance between the display pixels 111, 112 and the variable parallax barrier module 120. With the existence of the non-light-emitting region BM, the variable parallax barrier module 120, under a condition that the light-transmissive regions TR of each of the parallax barrier patterns NP1, NP2, NP3, NP4 have a width L+ΔL, is still able to enable one eye 40a of the user to only view the display images displayed by the display pixel 112 and the other eye 40b of the user to only view the display images displayed by the display pixel 111, so as to achieve the three-dimensional visual effect. Now, since a triangle using a width (1−r)S/2 of the non-light-emitting region BM at a side of the display pixel 111 as the base has a specific parametrical proportional relationship, thereby satisfying the following formula:

$$\frac{\Delta L}{(1-r)S} = \frac{D}{D+d}, \quad \text{(iv)}$$

and by substituting formula (i) into formula (iv), a relationship between width L of the light-transmissive regions OT in the variable parallax barrier module 520 and an increase width ΔL of the light-transmissive regions TR in the variable parallax barrier module 120 may be determined as follows:

$$\frac{\Delta L}{L} = 1 - r. \quad \text{(v)}$$

Therefore, it may further construe that the display apparatus 100, as compared to the display apparatus 100a of the comparative embodiment, enhances the overall brightness by $$\frac{\Delta L}{L} = (1-r) \times 100\%.$$

In the following below, detail descriptions regarding design mechanism differences in forming the light-transmissive regions TR and OT are further provided in accordance with FIG. 10.

Figure 10:
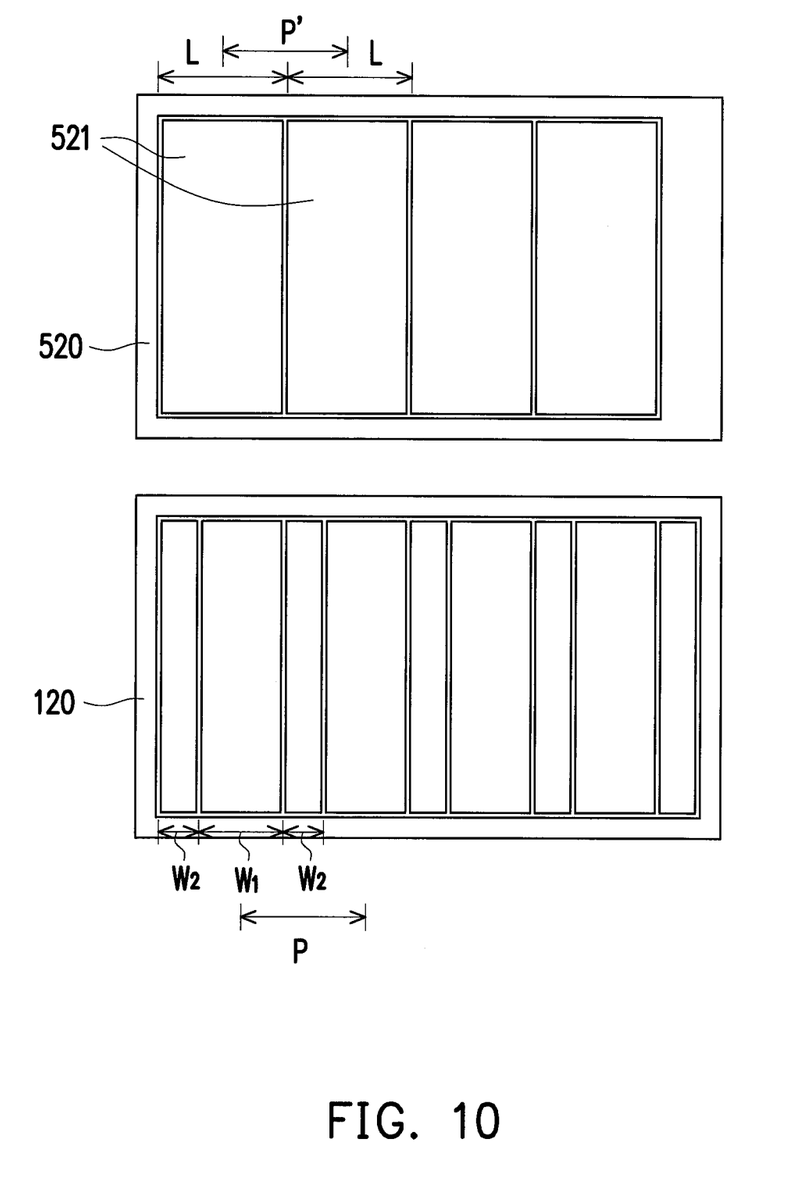
FIG. 10 is a schematic comparison diagram illustrating differences between the variable parallax barrier module of FIG. 3 and the variable parallax barrier module of the comparative embodiment.

FIG. 10 is a schematic comparison diagram illustrating differences between the variable parallax barrier module of FIG. 3 and the variable parallax barrier module of the comparative embodiment. Referring to FIG. 5A through FIG. 6 and FIG. 10 again, since in the light-transmissive regions $OT_{11}, OT_{12}, OT_{21}$ of all the parallax barrier patterns OP1, OP2, OP3, OP4 in the variable parallax barrier module 520, every two adjacent light-transmissive regions (such as $OT_{11}, OT_{21}$) does not overlap each other, a pitch P' of the switching units 521 of the variable parallax barrier module 520 in the arrangement direction D1 is substantially (L/2+L/2), namely L.

On the other hand, referring to FIG. 2A through FIG. 3 and FIG. 10 again, as shown in FIG. 3 and FIG. 10, since the pitch P of the first switching units 121*a* in the variable parallax barrier module 120 in the arrangement direction D1 is ($W_1$/2+$W_1$/2+$W_2$), namely ($W_1$+$W_2$), in order to prevent a phenomenon (viz. a stereo crosstalk phenomenon) of aliasing the viewing zone images from one viewing zone image set with the viewing zone images from another viewing zone image set that are supposed to be transmitted by the display apparatus 100 to the one of the viewing zones A1, A2, A3, A4 corresponded thereby, the pitch P of the first switching units 121*a* in the variable parallax barrier module 120 and the pitch P' of the variable parallax barrier module 520 of the comparative embodiment are designed to have the same value, so that each of the viewing zones A1, A2, A3, A4 is prevent from generating the stereo crosstalk phenomenon. As such, in the present embodiment, the pitch P of first switching units 121*a* in the variable parallax barrier module 120 in the arrangement direction D1 is also substantially L, and L is also substantially ($W_1$+$W_2$). In other words, each of the parameter P', P, L, $W_1$, $W_2$ also satisfies the following formula:

$$L = P' = P = W_1 + W_2 = \frac{D}{D+d}S. \quad \text{(vi)}$$

However, since the variable parallax barrier module 120 of the disclosure may enable any two adjacent light-transmissive region, such as $TR_{11}$ and $TR_{21}$, to partially overlap each other during the different display periods $t_1$, $t_2$, $t_3$, $t_4$ by switching each of the first switching units 121*a* and each of the second switching units 121*b*, and since the width L+ΔL of each of the light-transmissive regions TR is substantially equal to $W_1$+2$W_2$, the width $W_1$ of each of the first switching units 121*a* in the arrangement direction D1 and the width $W_2$ of each of the second switching units 121*b* in the arrangement direction D1 may be designed as satisfying the following formulae:

$$\frac{D}{D+d}S < W_1 + 2W_2 \le \frac{(2-r)SD}{D+d} \quad \text{and} \quad \text{(vii)}$$

$$0 < W_2 \le \frac{(1-r)SD}{D+d}. \quad \text{(viii)}$$

As a result, the variable parallax barrier module 120 of the disclosure is able to effectively enhance the proportion of light-transmissive region TR in each of the parallax barrier patterns NP1, NP2, NP3, NP4, and thereby achieve an effect of enhancing the overall image brightness. In the present embodiment, the width $W_2$ of each of the second switching units 121*b* is substantially equal to $$\frac{(1-r)SD}{D+d},$$

and $W_1$, for example, is substantially equal to $$\frac{rSD}{D+d}.$$

As such, the variable parallax barrier module 120 of the disclosure, under a condition of preventing each of the viewing zones A1, A2, A3, A4 from generating the stereo crosstalk phenomenon, is able to enhance the overall image brightness of the display apparatus 100 by as much as possible.

It is to be noted that, the disclosure is not limited thereto. In other embodiments, during an actual operation, a certain degree of stereo crosstalk phenomenon may also be allowed if the visual effect of the overall images is not influence. Now, the variable parallax barrier module 120 of the disclosure may further appropriately adjust the proportion between the width $W_1$ of each of the first switching units 121*a* in the arrangement direction D1 and the width $W_2$ of each of the second switching units 121*b* in the arrangement direction D1, so that the effect of enhancing the overall image brightness may further be appropriately increased. For instance, in the present embodiment, when the ratio of the width $W_2$ to the width $W_1$ is (1−r)/r, there is exactly no stereo crosstalk phenomenon being generated. On the other hand, if the ratio between the width $W_2$ and the width $W_1$ is appropriated increased to larger than (1−r)/r while not changing the pitch P (viz. the sum of the width $W_2$ and the width $W_1$), the width L+ΔL of the light-transmissive regions TR may further be substantially enhanced, and may be greater than $$\frac{(2-r)SD}{D+d},$$

thereby further enhancing the overall brightness.

More specifically, the variable parallax barrier module 120 of the disclosure satisfies the following formula:

$$0 < \frac{W_2}{W_1} \le 100. \quad \text{(ix)}$$

In the present embodiment, an upper limit of the ratio of the width $W_2$ to the width $W_1$, for example, is 100, but the disclosure is not limited thereto. In other embodiments, the ratio of the width $W_2$ to the width $W_1$ may be adjusted to other appropriate value according to the type of the display apparatus. The range of each parameter mentioned in the above is only provided for illustration purpose and is not intended for limiting the scope of the disclosure. Those skilled in the art should be able to perform the proportional design of the first switching units 121*a*, the second switching units 121*b* and the light-transmissive regions TR in each of the parallax barrier patterns NP1, NP2, NP3, NP4 by according to and considering actual requirements of light diffusion and of multiple reflections, and thus no further elaboration is provided herein.

More specifically, as the r value of the display apparatus becomes smaller, efficacy in the structural design of the disclosure becomes more prominent. For instance, when the display apparatus 100 of the disclosure is a light-emitting diode display or an organic light-emitting diode display, due to the r value of a light-emitting diode serving as each of the display pixels 111(112) of the display module 110 being smaller, the overall image brightness of the light-emitting diode display or the organic light-emitting diode display may be considerably be enhanced by applying the structural design of the display apparatus 100 of the disclosure. In addition, since the light-emitting diode is currently being frequently applied to large-scale outdoor billboards, the structural design of the disclosure may also be applied to the large-scale outdoor billboards, thereby effectively enhancing an overall image brightness when the large-scale outdoor billboards are serving as stereoscopic display apparatuses.

On the other hand, in the present embodiment, even though the pitch P of the first switching units 121a in the variable parallax barrier module 120 in the arrangement direction D1 being substantially equal to DS/(D+d) has been provided as an example, the disclosure is not limited thereto. In other embodiments, the pitch P of the first switching units 121a in the arrangement direction D1 may also substantially be equal to βDS/(D+d), wherein β is a positive number. Namely, those of skill in the art are able to slightly adjust the pitch P according to practical considerations. More specifically, when the width S of each of the display pixels 111(112) in the arrangement direction D1 is greater than the pitch P of the first switching units 121a in the arrangement direction D1, namely when βD/(D+d)<1, the lights are converged and gathered towards a distant point (as shown in FIG. 9). Furthermore, if the pitch P becomes larger, then the optimum viewing distance D is to be increased. Contrarily, if the pitch P becomes smaller, then the optimum viewing distance D is to be reduced. In other words, if the pitch P of the first switching units 121a in the variable parallax barrier module 120 in the arrangement direction D1 is smaller enough and may be adjusted, then an adjustment on an optical configuration may be performed according to the allowable optimum viewing distance D, such that when the optimum viewing distance D is allowed to be at a more distant point, the pitch P of the first switching units 121a in the arrangement direction D1 may be adjusted to be larger, and when the optimum viewing distance D is allowed to be at a closer point, the pitch P of the first switching units 121a in the arrangement direction D1 may be adjusted to be smaller. In addition, in another non-illustrated embodiment, when the width S of each of the display pixels 111(112) in the arrangement direction D1 is smaller or equal to the pitch P of the first switching units 121a in the arrangement direction D1, namely when βD/(D+d)≥=1, the lights do not converge. For instance, when the width S of each of the display pixels 111(112) is equal to the pitch P of the first switching units 121a, namely when βD/(D+d) equals 1, the lights are parallel. Now, a stereo image is to be formed by adjusting the contents of the images.

In addition, referring to FIG. 1 and FIG. 3 again, in the present embodiment, the display apparatus 100 may also display two-dimensional images. Specifically, the control unit 130 controls the variable parallax barrier module 120 to switch the first switching units 121a and the second switching units 121b into the light-transmissive state, and controls the display module 110 to display two-dimensional images to enable lights emitted by the two-dimensional images pass through all the first switching units 121a and all the second switching units 121b in the light-transmissive state, so that the user is able to view the two-dimensional images.

Figure 11:
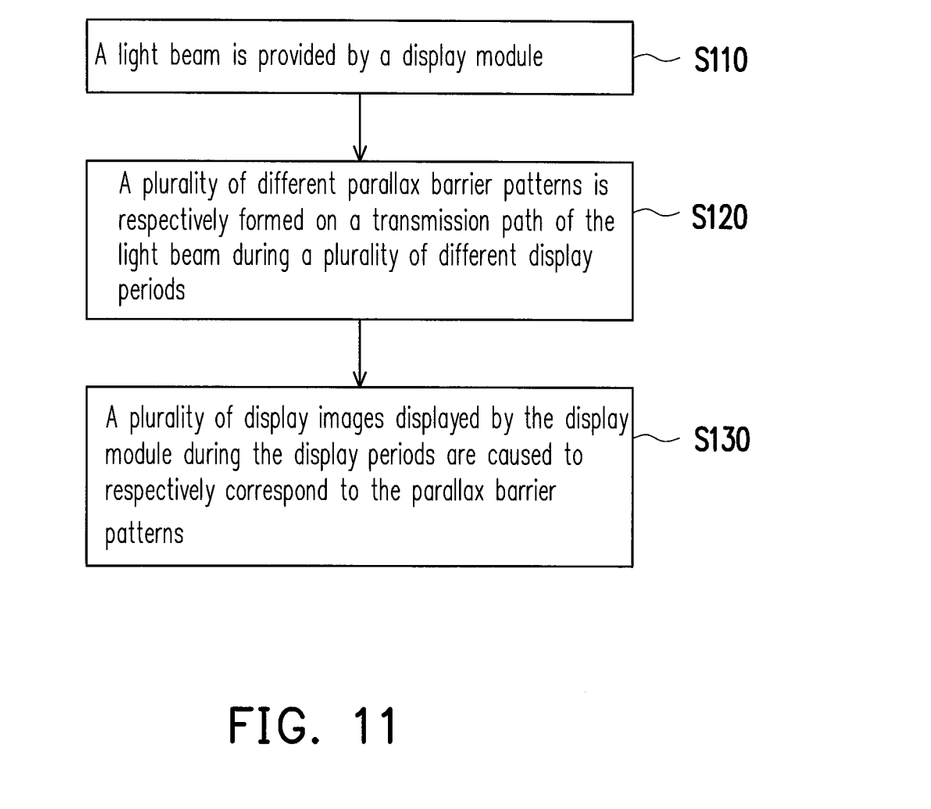
FIG. 11 is a flow chart illustrating a display method according to an exemplary embodiment.

FIG. 11 is a flow chart illustrating a display method according to an exemplary embodiment. Referring to FIG. 11, the display method of the present embodiment may be executed by the display apparatus 100 of FIG. 1, but the disclosure is not limited thereto. The display method of the present embodiment comprises the following steps. Firstly, step S110 is executed, a light beam 60 is provided by the display module 110. For instance, the step S110 may be executed through using the control unit 130 to control the display module 110.

Next, step S120 is executed, the different parallax barrier patterns NP1, NP2, NP3, NP4 are respectively formed on a transmission path of the light beam 60 during the different display periods $t_1$, $t_2$, $t_3$, $t_4$. Specifically, the step S120, for example, may be executed through using the control unit 130 to switch the first switching units 121a and the second switching units 121b in the variable parallax barrier module 120. More specifically, each of the parallax barrier patterns NP1, NP2, NP3, NP4 comprises the light-transmissive regions TR and the light-shielding regions SR alternately arranged along the arrangement direction D1, and in all the parallax barrier patterns NP1, NP2, NP3, NP4, any two adjacent light-transmissive regions, such as $TR_{11}$ and $TR_{21}$, partially overlap each other. For instance, the method for forming the light-transmissive regions TR and forming the light-shielding regions SR is to switch the first switching units 121a and the second switching units 121b between the light-transmissive state or the light-shielding state, wherein in each of the display periods $t_1$, $t_2$, $t_3$, $t_4$, each of the first switching units 121a in a portion of the first switching units 121a and two of the second switching units 121b adjacently located at two sides thereof are switched into the light-transmissive state, while the remaining first switching units 121a and the remaining second switching units 121b are switched into the light-shielding state.

Next, step S130 is then executed, the display images $P_{t1}$, $P_{t2}$, $P_{t3}$, $P_{t4}$ displayed by the display module 110 during the display periods $t_1$, $t_2$, $t_3$, $t_4$ of a frame time T are respectively caused to correspond to the parallax barrier patterns NP1, NP2, NP3, NP4. In the present embodiment, the step S130, for example, may be executed through the control unit 130. Specifically, during each of the display periods $t_1$, $t_2$, $t_3$, $t_4$, the display images $P_{t1}$, $P_{t2}$, $P_{t3}$, $P_{t4}$ displayed by the display module 110 comprise the viewing zone image sets $\{P1_{t1}, P2_{t1}, P3_{t1}, P4_{t1}\}$, $\{P1_{t2}, P2_{t2}, P3_{t2}, P4_{t2}\}$, $\{P1_{t3}, P2_{t3}, P3_{t3}, P4_{t3}\}$, $\{P1_{t4}, P2_{t4}, P3_{t4}, P4_{t4}\}$ sequentially staggered along the arrangement direction D1. And, since the light-transmissive regions TR of each of the parallax barrier patterns NP1, NP2, NP3, NP4 move along with the time, the display positions of the respective viewing zone image sets $\{P1_{t1}, P1_{t2}, P1_{t3}, P1_{t4}\}$, $\{P2_{t1}, P2_{t2}, P2_{t3}, P2_{t4}\}$, $\{P3_{t1}, P3_{t2}, P3_{t3}, P3_{t4}\}$, $\{P4_{t1}, P4_{t2}, P4_{t3}, P4_{t4}\}$ on the display module during the different display periods $t_1$, $t_2$, $t_3$, $t_4$ are made different, so as to correspond to each of the parallax barrier patterns NP1, NP2, NP3, NP4, and the display apparatus, during the display periods $t_1$, $t_2$, $t_3$, $t_4$, is enabled to respectively transmit the viewing zone images $P1_{t1}$, $P1_{t2}$, $P1_{t3}$, $P1_{t4}$ (or $P2_{t1}$, $P2_{t2}$, $P2_{t3}$, $P2_{t4}$; $P3_{t1}$, $P3_{t2}$, $P3_{t3}$, $P3_{t4}$; $P4_{t1}$, $P4_{t2}$, $P4_{t3}$, $P4_{t4}$) of a same viewing zone image set $\{P1_{t1}, P1_{t2}, P1_{t3}, P1_{t4}\}$ (or $\{P2_{t1}, P2_{t2}, P2_{t3}, P2_{t4}\}$, $\{P3_{t1}, P3_{t2}, P3_{t3}, P3_{t4}\}$, $\{P4_{t1}, P4_{t2}, P4_{t3}, P4_{t4}\}$) to a same viewing zone A1 (or A2, A3, A4). Namely, although the position of each of the viewing zone images $P1_{t1}$, $P1_{t2}$, $P1_{t3}$, $P1_{t4}$ of the viewing zone image set $\{P1_{t1}, P1_{t2}, P1_{t3}, P1_{t4}\}$ are different during the different display periods $t_1$, $t_2$, $t_3$, $t_4$, all the viewing zone images $P1_{t1}$, $P1_{t2}$, $P1_{t3}$, $P1_{t4}$ of the viewing zone image set $\{P1_{t1}, P1_{t2}, P1_{t3}, P1_{t4}\}$ are eventually transmitted to the same viewing zones A1. As a result, the design of each of the viewing zone image sets may be performed in the different display periods $t_1$, $t_2$, $t_3$, $t_4$, and the user is enabled to view the images with at least two viewing zones, thereby achieving a stereoscopic visual effects.

Since the display method of the present embodiment, as being similar to the display apparatus of the previous embodiment, is also able to allow any two adjacent light-transmissive regions, such as $TR_{11}$ and $TR_{21}$, to partially overlap each other during the different display periods $t_1$, $t_2$, $t_3$, $t_4$ by switching each of the first switching units 121a and each of the second switching units 121b so as to enhance the proportion of the light-transmissive regions TR in each of the parallax barrier patterns NP1, NP2, NP3, NP4, the display method of the present embodiment also contains the similar effects as described in the display apparatus of the previous embodiment, and thus are not to be repeated herein. In addition, other implementation details of the display method of the present embodiment are already provided in the detail descriptions regarding the implementation of the display apparatus 100 (please refer to the contents in the above paragraphs for the relevant details), and thus are not to be repeated herein.

In summary, in the display apparatus, the variable parallax barrier module and the display method of the exemplary embodiments of the disclosure, since the variable parallax barrier module may form the different parallax barrier patterns, and in the light-transmissive regions of all the parallax barrier patterns, any two adjacent light-transmissive regions partially overlap each other, the proportion of the light-transmissive regions in each of the parallax barrier patterns may be enhanced, so as to enhance the brightness of the overall stereo image displayed by the display apparatus. In addition, the display method of the exemplary embodiment of the disclosure, through forming the different parallax barrier patterns and enabling any two adjacent light-transmissive regions in all the parallax barrier patterns to partially overlap each other, may also enhance the proportion of the light-transmissive regions in each of the parallax barrier patterns, so as to enhance the brightness of the overall stereo image.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A display apparatus, comprising:
a display module configured to provide a light beam;
a variable parallax barrier module disposed on a transmission path of the light beam, the variable parallax barrier module respectively forming a plurality of different parallax barrier patterns during different display periods of a frame time, each of the parallax barrier patterns comprising a plurality of light-transmissive regions and a plurality of light-shielding regions alternately arranged along an arrangement direction, wherein any two adjacent light-transmissive regions in the light-transmissive regions of the parallax barrier patterns partially overlap each other, and the variable parallax barrier module comprises a plurality of first switching units and a plurality of second switching units alternately arranged along the arrangement direction, and in each of the display periods, each of the first switching units in a portion of the first switching units and two of the second switching units adjacently located at two sides of the each of the first switching units in the portion of the first switching units are switched into a light-transmissive state so as to form the light-transmissive regions, while the remaining first switching units and the remaining second switching units are switched into a light-shielding state so as to form the light-shielding regions; and
a control unit enabling a plurality of display images displayed by the display module during the display periods to respectively correspond with the parallax barrier patterns.

2. The display apparatus as recited in claim 1, wherein a width of each of the first switching units in the arrangement direction is different from a width of second switching units in the arrangement direction.

3. The display apparatus as recited in claim 1, wherein the variable parallax barrier module comprises a plurality of strip-shaped pixels arranged along the arrangement direction, each of the first switching units comprises a plurality of strip-shaped pixels in a portion of the strip-shaped pixels, and each of the second switching units comprises a plurality of strip-shaped pixels in another portion of the strip-shaped pixels.

4. The display apparatus as recited in claim 1, wherein the control unit is configured to control the variable parallax barrier module to switch all the first switching units and all the second switching units to the light-transmissive state, and configured to control the display module to display two-dimensional images so that lights emitted by the two-dimensional images pass through all the first switching units and all the second switching units in the light-transmissive state.

5. The display apparatus as recited in claim 1, wherein the display apparatus satisfies $$\frac{D}{D+d}S < W_1 + 2W_2 \leq \frac{(2-r)SD}{D+d} \text{ and}$$
$$0 < W_2 \leq \frac{(1-r)SD}{D+d},$$

wherein $W_1$ is a width of each of the first switching units in the arrangement direction, $W_2$ is a width of each of the second switching units in the arrangement direction, S is a width of each of display pixels of the display module in the arrangement direction, r is a ratio of a width of a light-emitting region of each of the display pixels in the arrangement direction to the width of each of the display pixels in the arrangement direction, d is a distance between the display pixels and the variable parallax barrier module, D is an optimum viewing distance from the variable parallax barrier module to a plurality of viewing zones, and a pitch of the first switching units in the arrangement direction is substantially DS/(D+d).

6. The display apparatus as recited in claim 1, wherein the display image displayed by the display module in each of the display periods comprises a plurality of viewing zone image sets sequentially staggered along the arrangement direction, and lights emitted by the viewing zone image set, after passing through the variable parallax barrier module, are respectively transmitted to a plurality of different viewing zones.

7. The display apparatus as recited in claim 6, wherein a display position of each of the viewing zone image sets on the display module during the different display periods is different.

8. The display apparatus as recited in claim 6, wherein the same viewing zone image set is transmitted to the same viewing zone during the different display periods.

9. The display apparatus as recited in claim 1, wherein the light beam carries the display images.

10. A variable parallax barrier module, comprising:
a plurality of switching units arranged along an arrangement direction; and
a drive unit driving the switching units to from a plurality of different parallax barrier patterns during different display periods, wherein each of the parallax barrier patterns comprises a plurality of light-transmissive regions and a plurality of light-shielding regions alternately arranged along the arrangement direction, and in all the parallax barrier patterns, any two adjacent light-transmissive regions partially overlap each other, and the switching units comprise a plurality of first switching units and a plurality of second switching units alternately arranged along the arrangement direction, and in each of the display periods, each of the first switching units in a portion of the first switching units and two of the second switching units adjacently located at two sides of the each of the first switching units in the portion of the first switching units are switched into a light-transmissive state so as to form the light-transmissive regions, while the remaining first switching units and the remaining second switching units are switched into a light-shielding state so as to form the light-shielding regions.

11. The variable parallax barrier module as recited in claim 10 further comprising a plurality of strip-shaped pixels arranged along the arrangement direction, wherein each of the first switching units comprises a plurality of strip-shaped pixels in a portion of the strip-shaped pixels, and each of the second switching units comprises a plurality of strip-shaped pixels in another portion of the strip-shaped pixels.

12. The variable parallax barrier module as recited in claim 10, wherein a width of each of the first switching units in the arrangement direction is different from a width of the second switching units in the arrangement direction.

13. A display method, comprising:
providing a light beam by a display module;
forming a plurality of different parallax barrier patterns on a transmission path of the light beam respectively during different display periods, wherein each of the parallax barrier patterns comprises a plurality of light-transmissive regions and a plurality of light-shielding regions alternately arranged along an arrangement direction, and in all the parallax barrier patterns, any two adjacent light-transmissive regions partially overlap each other,
wherein a method for forming the light-transmissive regions and the light-shielding regions comprise:
switching a plurality of first switching units and a plurality of second switching units alternately arranged along the arrangement direction between a light-transmissive state and a light-shielding state, wherein in each of the display periods, each of the first switching units in a portion of the first switching units and two of the second switching units adjacently located at two sides of the each of the first switching units in a portion of the first switching units are switched into the light-transmissive state, while the remaining first switching units and the remaining second switching units are switched into the light-shielding state; and
causing a plurality of display images displayed by the display module during the display periods to respectively correspond to the parallax barrier patterns.

14. The display method as recited in claim 13, wherein a width of each of the first switching units in the arrangement direction is different from a width of second switching units in the arrangement direction.

15. The display method as recited in claim 13, wherein a method for switching each of the first switching units and each of the second switching units between the light-transmissive state and the light-shielding state comprises:
switching a plurality of strip-shaped pixels in each of the first switching units and a plurality of strip-shaped pixels in each of the second switching units.

16. The display method as recited in claim 13 further comprising:
switching all the first switching units and all the second switching units into the light-transmissive state; and
controlling the display module to display two-dimensional images, so that lights emitted by the two-dimensional images pass through all the first switching units and all the second switching unit in the light-transmissive state.

17. The display method as recited in claim 13 further comprising satisfying following formulae:

$$\frac{D}{D+d}S < W_1 + 2W_2 \le \frac{(2-r)SD}{D+d} \text{ and}$$

$$0 < W_2 \le \frac{(1-r)SD}{D+d},$$

wherein $W_1$ is a width of each of the first switching units in the arrangement direction, $W_2$ is a width of each of the second switching units in the arrangement direction, S is a width of each of the display pixels of the display module in the arrangement direction, r is a ratio of a width of a light-emitting region of each of the display pixels in the arrangement direction to the width of each of the display pixels in the arrangement direction, d is a shortest distance between the display pixels and the variable parallax barrier module, D is an optimum viewing distance from the variable parallax barrier module to a plurality of viewing zones, and a pitch of the first switching units in the arrangement direction is substantially DS/(D+d).

18. The display method as recited in claim 13 further comprising:
enabling the display module to display a plurality of viewing zone image sets sequentially staggered along the arrangement direction during each of the display periods, and to respectively transmit the viewing zone image sets to a plurality of different viewing zones.

19. The display method as recited in claim 18, wherein a display position of each of the viewing zone image sets on the display module during the different display periods is different.

20. The display method as recited in claim 18, wherein during the different display periods, the same viewing zone image set is transmitted to the same viewing zone.

21. The display method as recited in claim 13, wherein the light beam carries the display images.

* * * * *